(No Model.) 11 Sheets—Sheet 1.

F. A. MAGEE.
HEATING STOVE.

No. 353,033. Patented Nov. 23, 1886.

Figure 1:
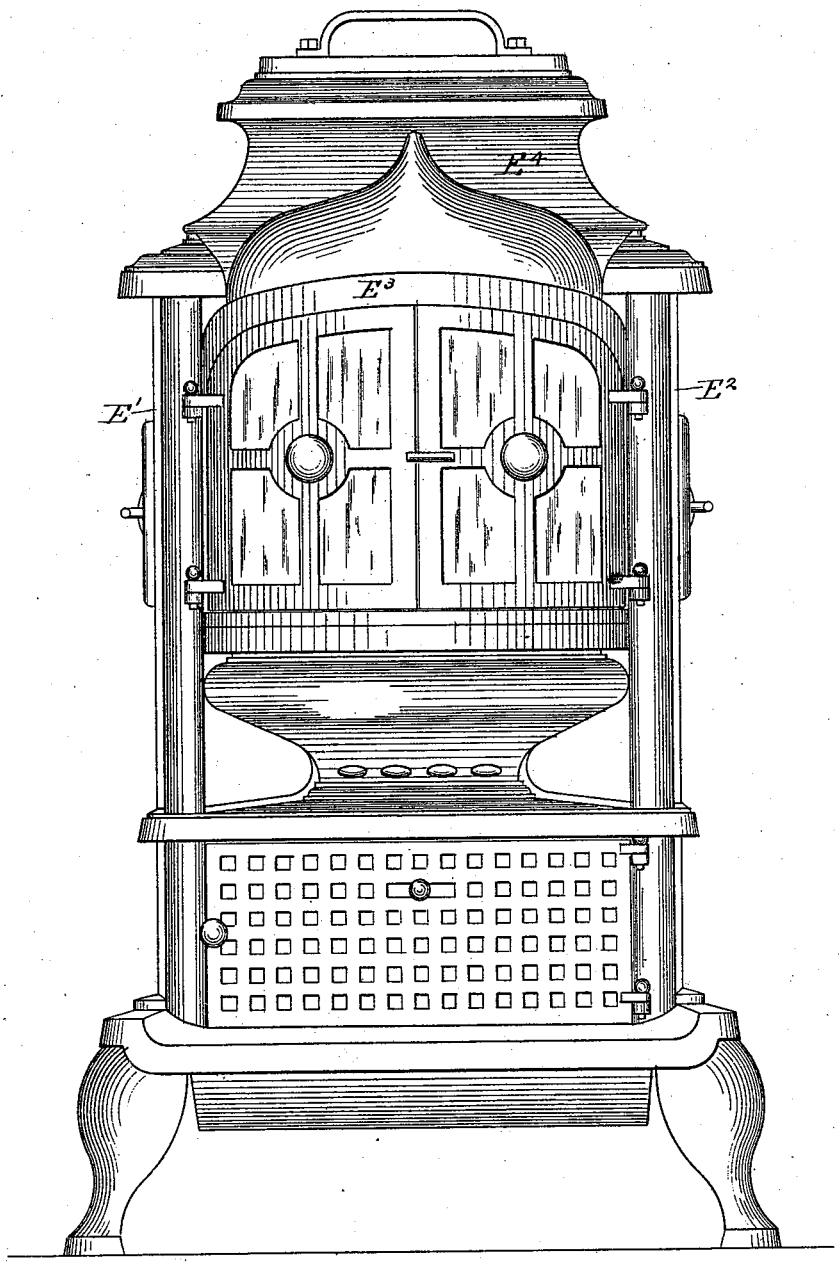

WITNESSES. Fig. 1. INVENTOR.

(No Model.)

F. A. MAGEE.
HEATING STOVE.

No. 353,033.

11 Sheets—Sheet 3.

Patented Nov. 23, 1886.

WITNESSES.
J. M. Dolan.
Fred. B. Dolan.

INVENTOR.
Frank A. Magee
by his attys
Clarke & Raymond.

(No Model.) 11 Sheets—Sheet 5.
F. A. MAGEE.
HEATING STOVE.

No. 353,033. Patented Nov. 23, 1886.

WITNESSES.
J. M. Dolan
Fred. B. Dolan.

INVENTOR.
Frank A. Magee
by his attys
Clarke & Raymond.

(No Model.) 11 Sheets—Sheet 6.

F. A. MAGEE.
HEATING STOVE.

No. 353,033. Patented Nov. 23, 1886.

WITNESSES. INVENTOR.

(No Model.) 11 Sheets—Sheet 7.

F. A. MAGEE.
HEATING STOVE.

No. 353,033. Patented Nov. 23, 1886.

WITNESSES.
J. M. Dolan.
Fred. B. Dolan.

INVENTOR.
Frank A. Magee
by his attys
Clarke & Raymond (No Model.)   F. A. MAGEE.   11 Sheets—Sheet 8.

HEATING STOVE.

No. 353,033.   Patented Nov. 23, 1886.

WITNESSES.
J. M. Dolan.
Fred. B. Dolan.

INVENTOR.
Frank A. Magee
by his atty.
Charles H. Raymond.

(No Model.) 11 Sheets—Sheet 9.
F. A. MAGEE.
HEATING STOVE.
No. 353,033. Patented Nov. 23, 1886.

WITNESSES.
J. Mc Dolan
Fred. B. Dolan

INVENTOR.
Frank A. Magee
by his attys
Clarke & Raymond (No Model.)  
11 Sheets—Sheet 10.

F. A. MAGEE.
HEATING STOVE.

No. 353,033. Patented Nov. 23, 1886.

WITNESSES.

INVENTOR (No Model.)  
11 Sheets—Sheet 11.

F. A. MAGEE.
HEATING STOVE.

No. 353,033. Patented Nov. 23, 1886.

WITNESSES.  
J. Mc. Dolan.  
Fred. B. Dolan.

INVENTOR.  
F. A. Magee  
by his attys  
Clarke & Raymond.

UNITED STATES PATENT OFFICE.

FRANK A. MAGEE, OF CHELSEA, ASSIGNOR TO THE MAGEE FURNACE COMPANY, OF BOSTON, MASSACHUSETTS.

HEATING-STOVE.

SPECIFICATION forming part of Letters Patent No. 353,033, dated November 23, 1886.

Application filed March 6, 1886. Serial No. 194,200. (No model.)

*To all whom it may concern:*

Be it known that I, FRANK A. MAGEE, of Chelsea, in the county of Suffolk and State of Massachusetts, a citizen of the United States, have invented a new and useful Improvement in Heating-Stoves, of which the following is a full, clear, and exact description, reference being had to the accompanying drawings, forming a part of this specification, in explaining its nature.

The invention belongs to that class of stoves or furnaces used for heating; and it relates to the arrangement within the combustion-chamber of the stove or furnace of a deflecting plate, surface, or partition to cause the products of combustion to be thrown forward toward the front of the stove or furnace and upward into the upper section thereof, for the purpose of increasing its heating capacity.

In the drawings accompanying this specification I have represented the invention as applied both to magazine or base-burning stoves and to stoves and furnaces which do not have the magazine. In the magazine-stove shown the deflecting surface or partition is on either side of the magazine, arranged between its back and sides and the back and side plates of the stove to project outward and upward from said plates into the combustion-chamber, to provide or form a deflecting or guiding surface for directing the products of combustion to the front and upper parts of the chamber.

The invention further relates to the arrangement of the down-flues or exit-flues of the stove in relation to the deflecting plate or surface and the top of the combustion-chamber, whereby the products of combustion are caused to pass over the deflecting plate or surface to the flues.

In the drawings the stove is represented as provided with the three-flue system; but I recognize the fact that this improvement can be used to advantage, combined with the sheet-flue system, with two flues, or, in fact, with any of the systems now in use.

The invention further relates to an air-heating chamber extending from each side of the stove above the deflecting-plate, and connected back of the magazine; or it may be in the form of separate or detached chambers, which chamber or chambers are connected with the outer air by holes or apertures in the side plates.

The invention also provides for a passage or extension of the air-heating chamber or chambers to one or more openings in the back plate of the stove, which, if desired, may open directly into a pipe for conveying heated air from the heating-chamber to another apartment or into an intermediate drum.

It further relates to various details of construction, all of which will hereinafter be fully described.

Figure 2:
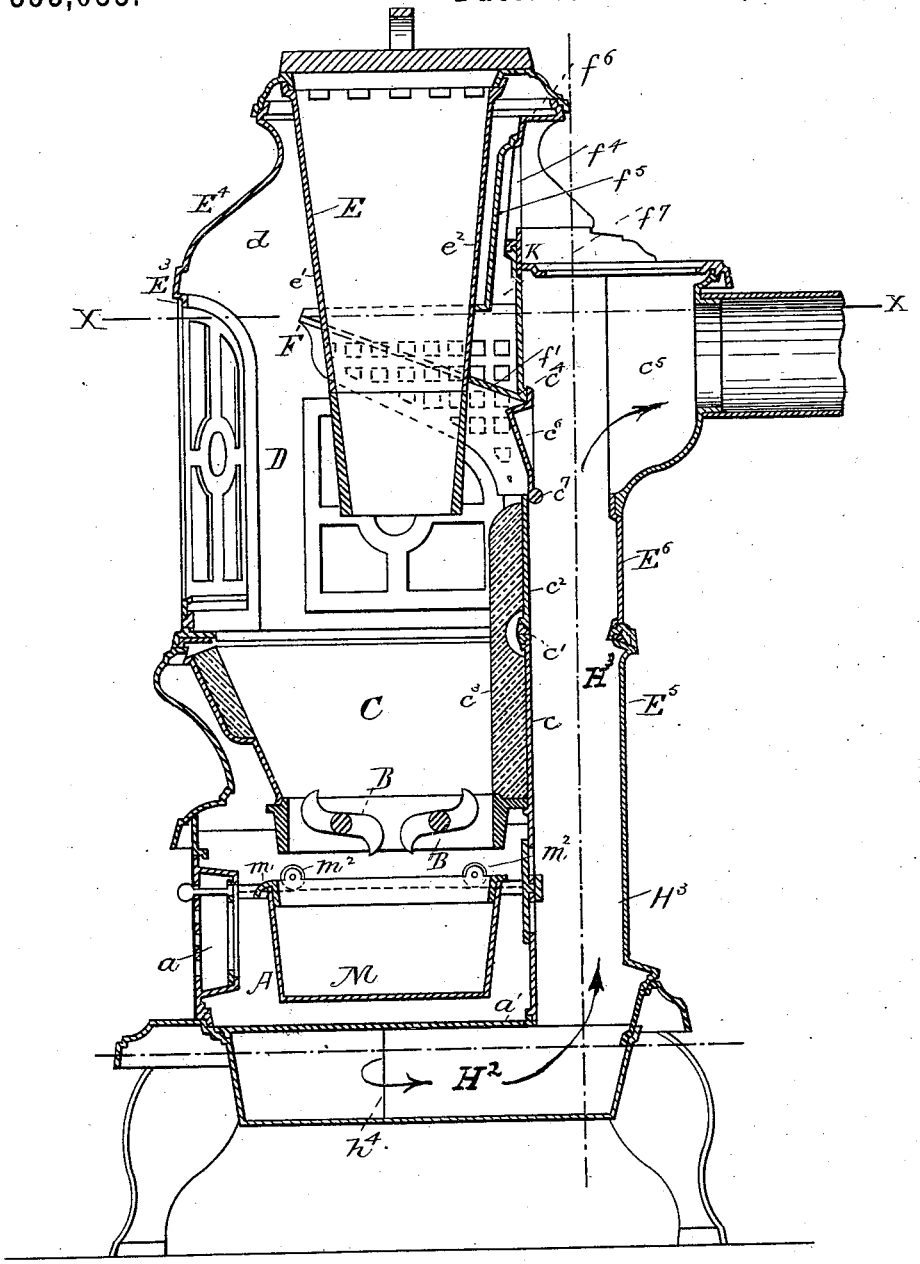
Figure 3:
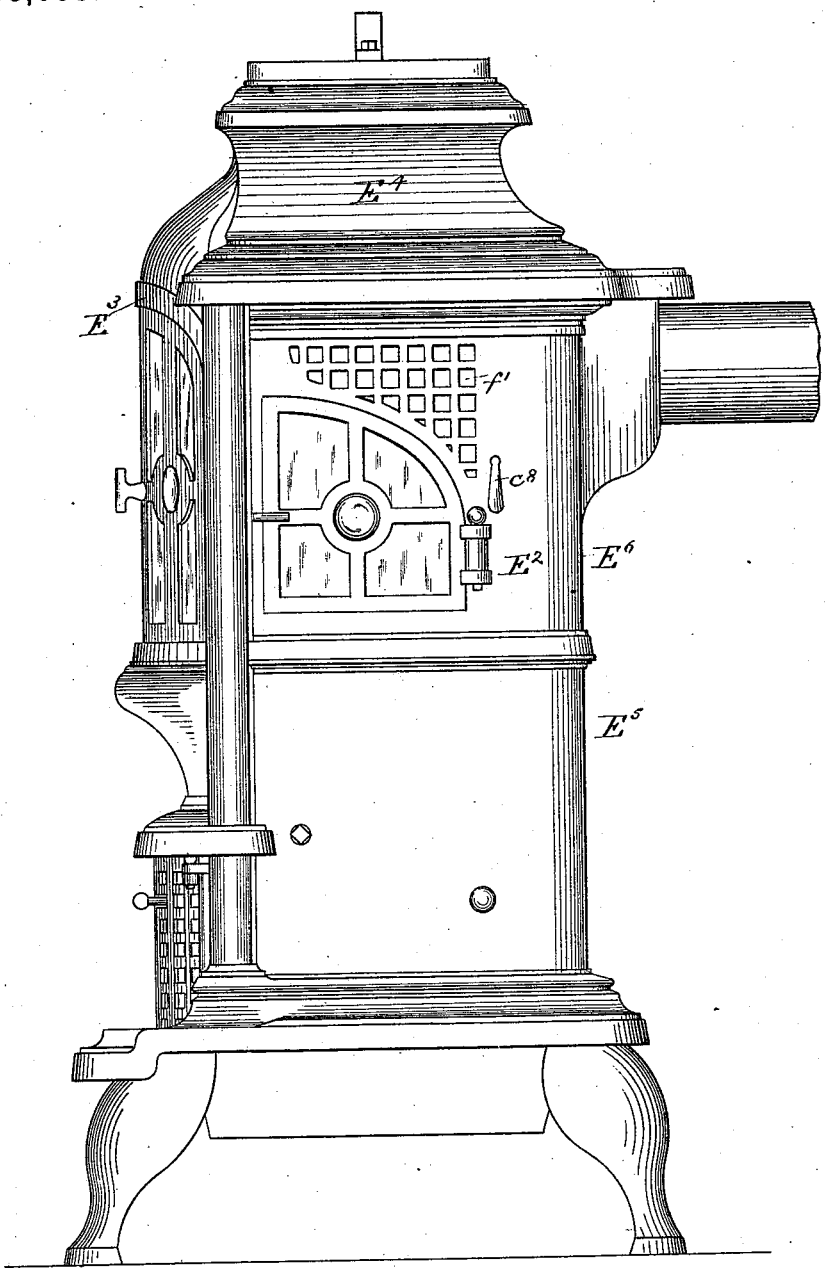
Figure 4:
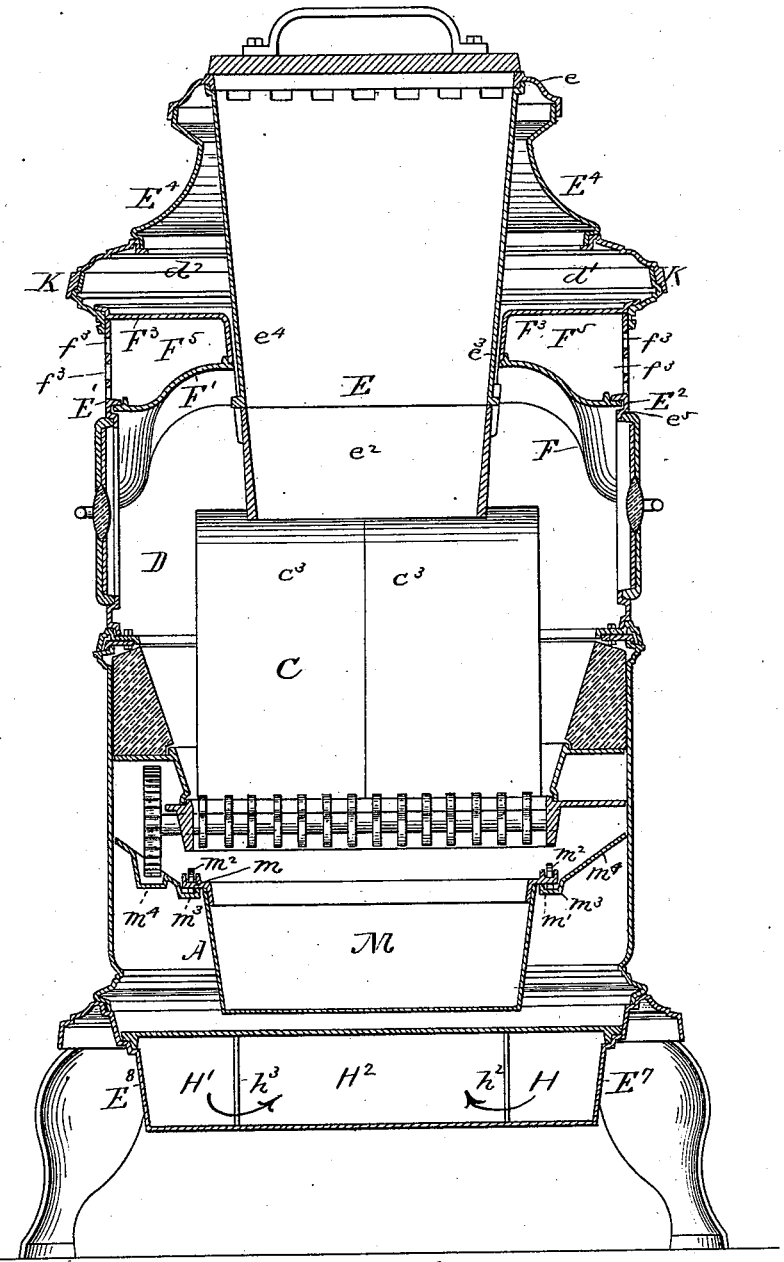
Figure 5:
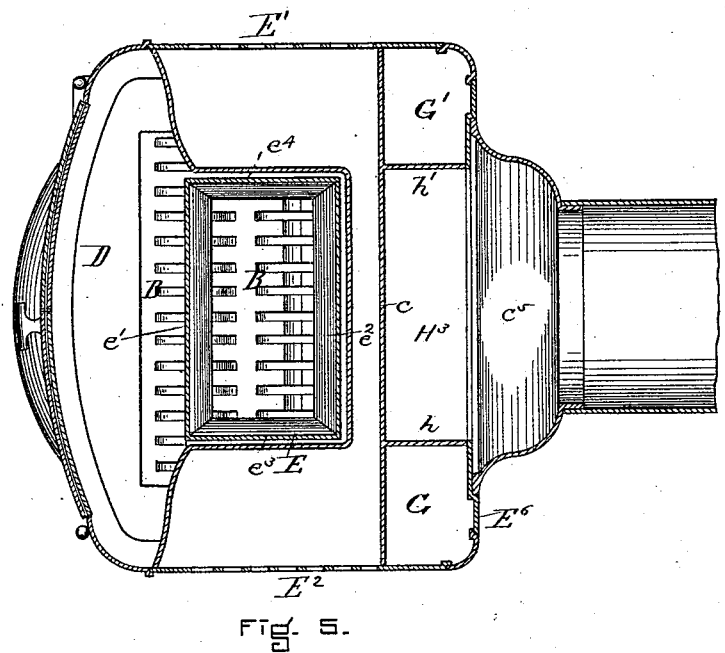
Figure 7:
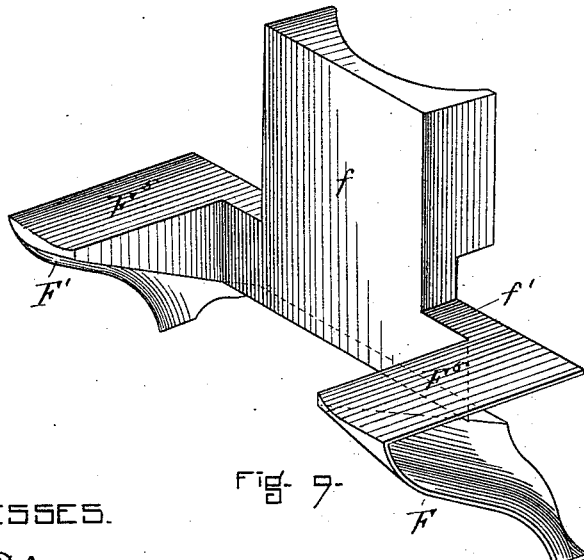
Figure 6:
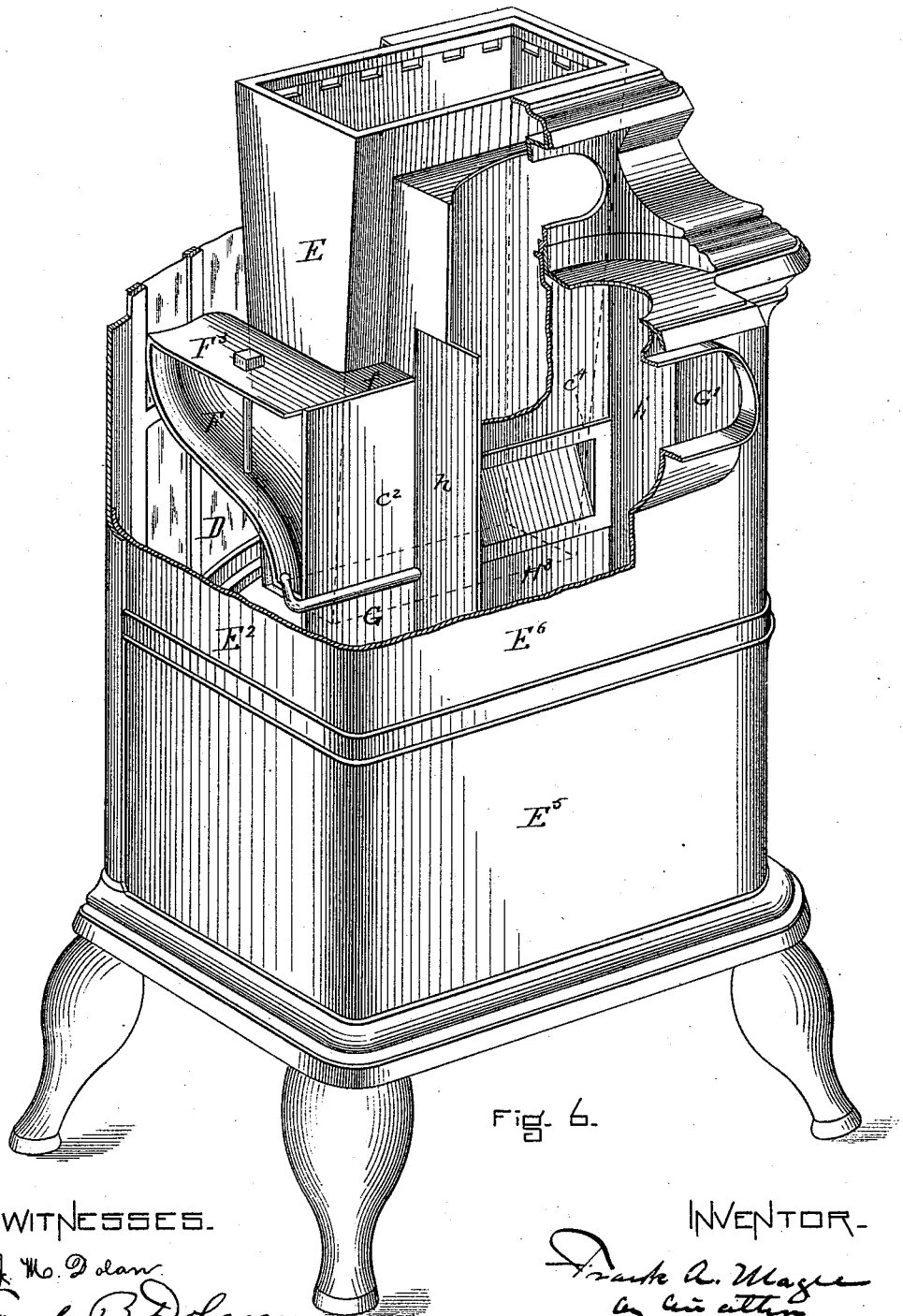
Figure 7:
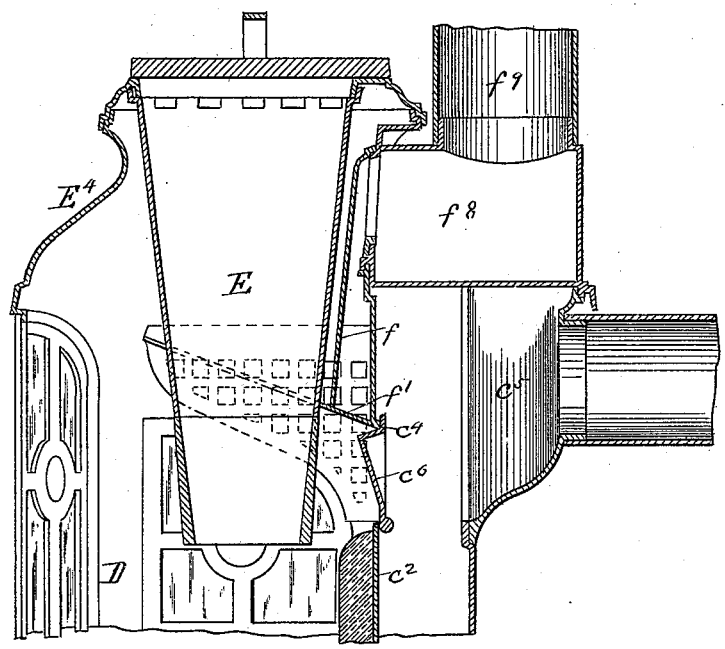
Figure 8:
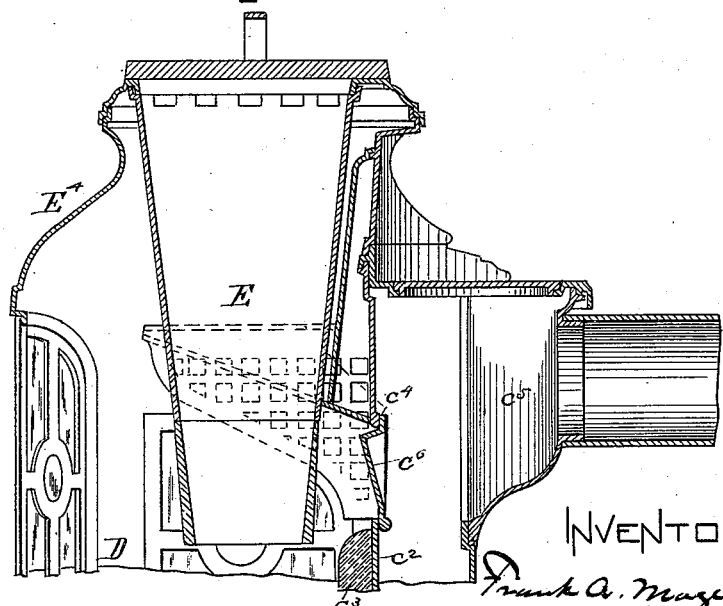
Figure 10:
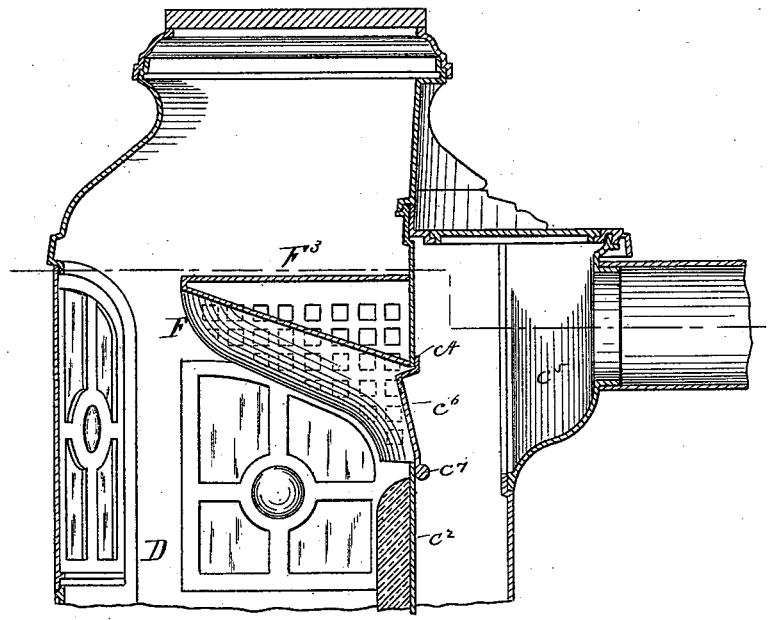
Figure 11:
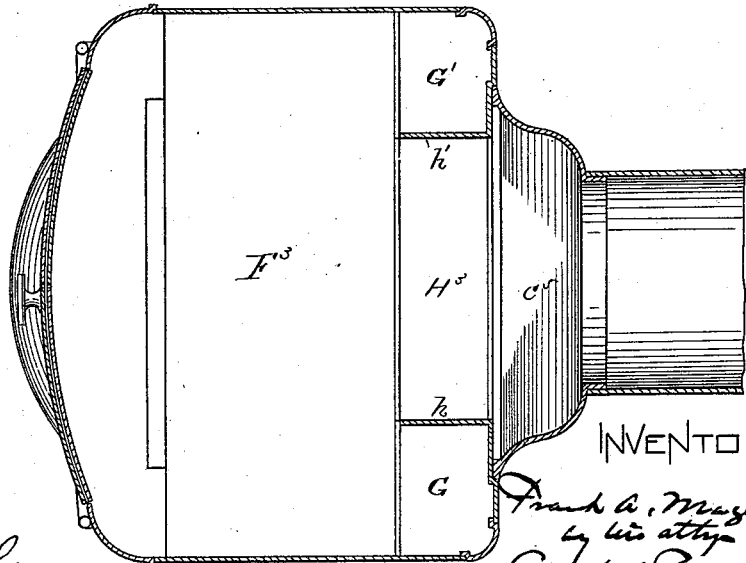
Figures 12, 13, 14:
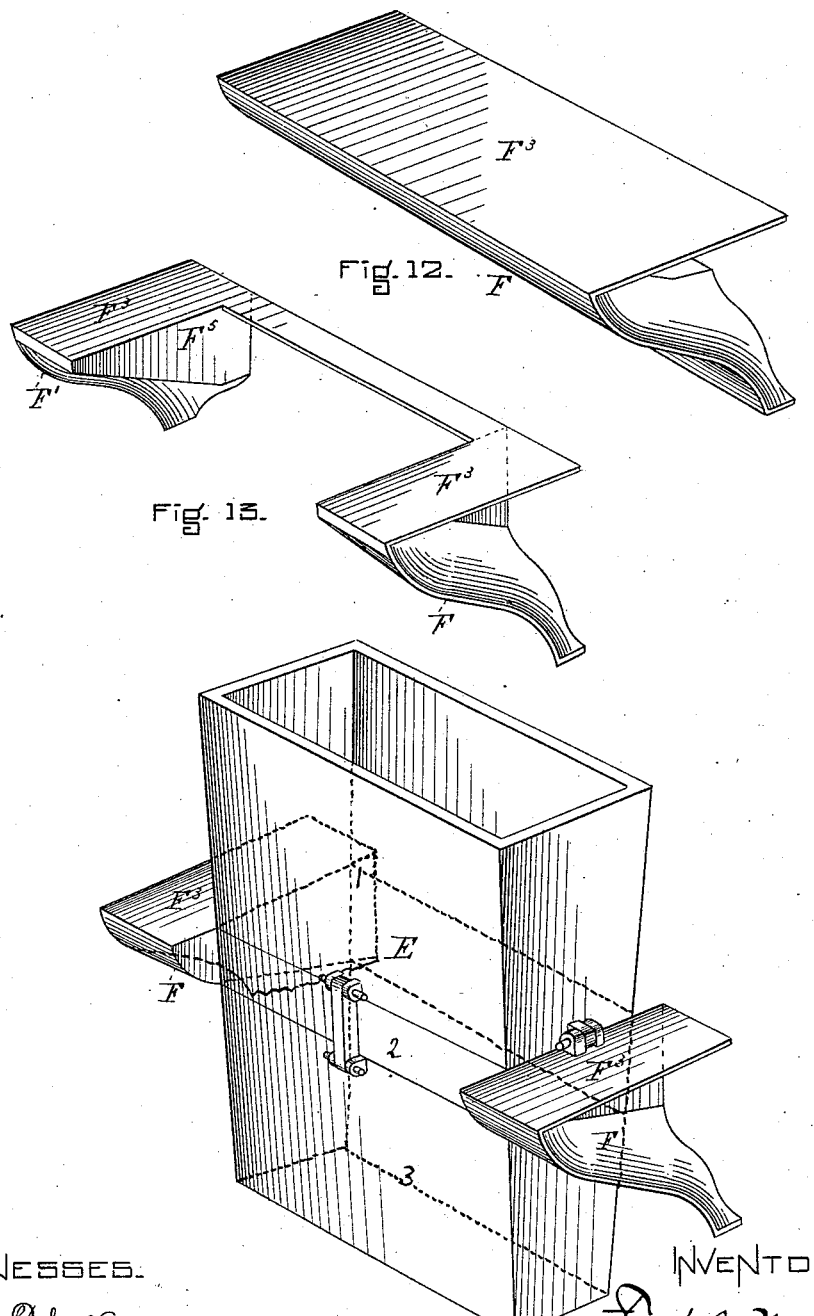
Figure 15:
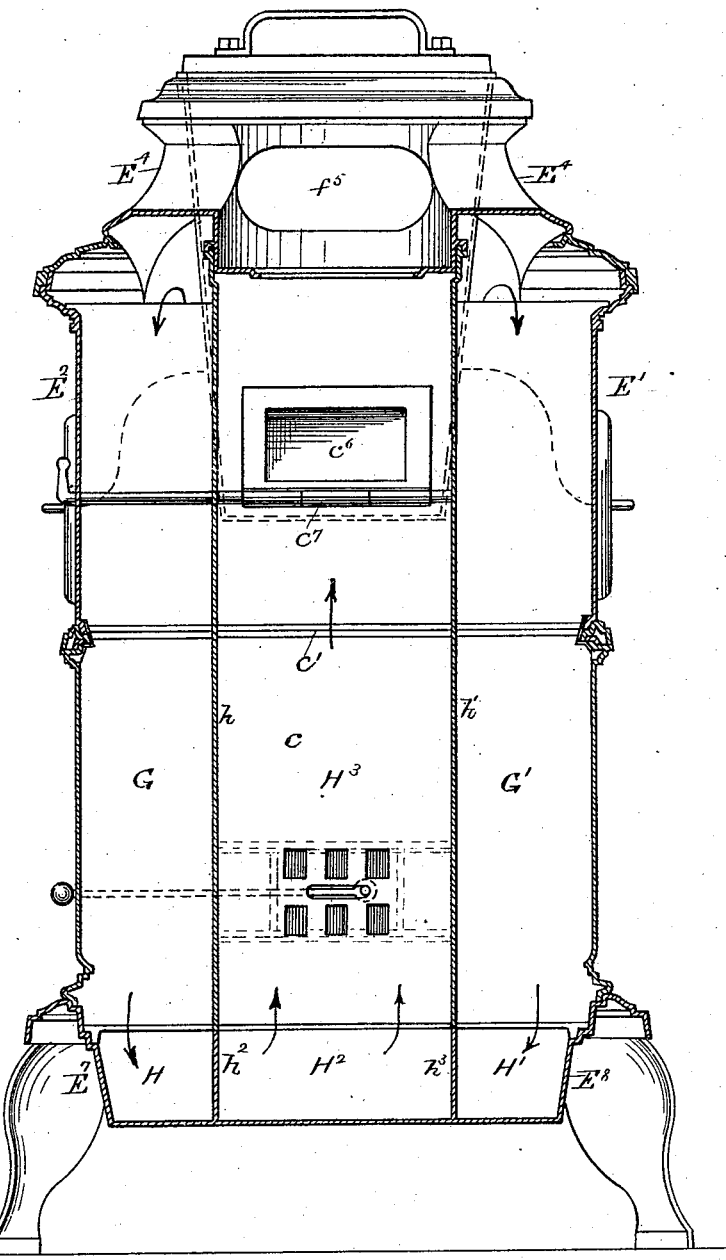
Figure 16:
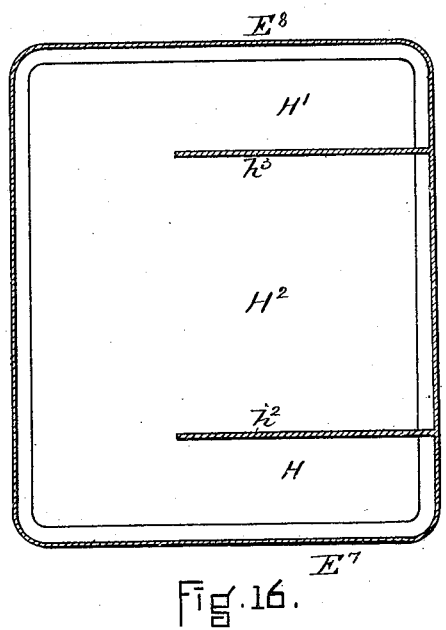

Referring to the drawings, Figure 1 is a view of the stove in front elevation. Fig. 2 is a vertical central section thereof from the front and back. Fig. 3 is a view of the stove in side elevation. Fig. 4 is a vertical central section of the stove from side to side. Fig. 5 is a horizontal section upon the line $x\ x$ of Fig. 2. Fig. 6 is a view in perspective showing a part of the side and back plates of the stove broken out to expose the arrangement of plates, flues, and passages, and to illustrate the interior construction. Figs. 7 and 8 are views of the upper part of the stove in vertical section, to illustrate slight modifications hereinafter referred to. Fig. 9 is a perspective view of the plates for forming one form of air-heating chamber and the deflecting-partition in one casting. Figs. 10, 11, and 12 illustrate the application of the invention to stoves unprovided with magazine. Figs. 13 and 14 illustrate modified forms of construction. Fig. 15 is a longitudinal vertical section through the down and up take flues of the stove. Fig. 16 is a view in horizontal section of the base below the ash-pit, to show the relation of the base-flues to each other.

In the drawings, A is the ash-pit; $a$, the entrance thereto. B is the grate, C the fire-pot, and D the combustion-chamber. There is arranged to extend upward from the plate $a'$, forming the ash-pit bottom, a vertical flue-plate, $c$, which extends across the stove from side to side and up to the point $c'$, and the plate $c^2$ extends upward, and in substantial continuation of the plate $c$, from the point $c'$ to the top ring, K, of the stove. These plates $c\ c^2$ are lined upon that portion of their surface forming a part of the fire-pot by firebrick $c^3$. The plate $c^2$ has the opening $c^4$, (shown in drawings closed by damper $c^6$,) which connects the combustion-chamber D with the direct escape port or passage $c^5$. This opening $c^4$ is closed or controlled by the damper $c^6$, which is attached to the rod $c^7$, extending throughout the stove, and having a handle, $c^8$, by which it is turned.

E is the magazine, and it has the front wall, $e'$, the rear wall, $e^2$, and the side walls, $e^3$ $e^4$. There is arranged on each side of the magazine, extending from the rear plate, $c^2$, and from the side plates, $E'$ $E^2$, of the stove, respectively, the partition F F'. This partition extends upward and outward from the back plate, $c^2$, and inward into the combustion-chamber, its inner edges extending to the side walls, $e^3$ $e^4$, of the magazine, and it extends, preferably, into the combustion-chamber slightly beyond the front wall, $e'$, of the magazine. The portion F of the partition is upon one side of the magazine and the portion F' upon the other side, and these parts are connected by the section $f'$ back of the magazine, or between the rear wall of the magazine and the plate $c^2$, which forms the upper wall or surface to this part of the combustion-chamber. The shape of the partition is such that it causes the products of combustion impinging against its under surface to be thrown outward toward the front of the chamber.

The combustion-chamber D extends above the partition at the front of the stove in front of the wall $e'$ of the magazine, or between it and the upper part, $E^3$, of the front of the stove. From this upper front section of the combustion-chamber there extends backward on either side of the magazine, between its side walls $e^3$ $e^4$ and the top plate, $E^4$, of the stove, the branches or sections $d'$ $d^2$ of the combustion-chamber, (see Fig. 4;) and at their rear ends they connect with or open into the corner flues, G G', which are formed by the plates $c$ $c^2$, the back plates, $E^5$ $E^6$, the side plates, $E'$ $E^2$, and the partition-plates $h$ $h'$. These corner flues G G' extend downward, and connect at their lower ends with the horizontal base-flues H H', which extend forward in the sides of the base-section, and come together or unite at the front thereof, and open into the central horizontal return-flue, $H^2$, which in turn opens into or connects with the central uptake passage or flue $H^3$, which opens into the direct escape-passage $c^5$. The base-flues are formed by the partition-plates $h^2$ $h^3$, (see Fig. 4,) which are horizontal continuations of the partition-plates $h$ $h'$, the flues H being between the flue-plates $h^2$ and the side wall $E^7$ of the base, and the flue H' being between the flue-plate $h^3$ and the side wall $E^8$ of the base. The flue $H^2$ is between these flue-plates $h^2$ $h^3$, and the flue-plates do not extend to the front of the base, but end at the point $h^4$.

The partition or deflecting plates F F' are also utilized to form the under walls or plates of the air-heating chamber $F^2$, the sides and top of which are formed by the plates $F^3$, extending, respectively, from each side of the walls $E'$ and $E^2$ toward the side walls $e^3$ $e^4$ of the magazine. These plates $F^3$ are preferably cast integral with a connecting portion, $f$, which extends about the back of the magazine, and forms the top wall of the section of the air-heating chamber behind the magazine, and also the front wall thereof, which extends downward and connects the two parts or divisions of the deflecting-plate together. I prefer in construction to make the two plates F F' and plate $f$, providing the deflecting surface and partition, and the side and top wall or plates $F^3$, in one casting, as shown in Fig. 9. If the chamber $F^2$ has, in addition to the side openings, $f^3$, an opening at the back of the stove, then I extend upward from the plate $f'$ the plate $f^5$, which extends to and connects with the top plate, $E^4$, of the stove at $f^6$. This forms, in connection with the back plate, $c^2$, an upwardly-extending passage, $f^7$, to the outlet $f^4$. This heating-chamber may not be connected by the section behind the magazine, if not desired, in which case there would be in substance two separate heating-chambers, $F^2$, one at each side of the magazine, instead of one formed of the two united by the communicating section or passage above described.

The air-heating chamber may be connected by the passage $f^7$ with a drum, $f^8$, (see Fig. 7,) which in turn is adapted to be connected by a pipe, $f^9$, with any other apartment; or the pipe $f^9$ may extend directly from the opening $f^4$.

The ash-pan M is represented as provided with the flanges $m$ $m'$, which support anti-friction rolls $m^2$, and these are in turn supported in the recesses $m^3$ at the lower edge of the inclined plate $m^4$, in which they are adapted to run, and so that the under surface of the ash-pan shall not rest upon the bottom plate of the ash-pit. This form of construction enables the ash-pan to be withdrawn and replaced with comparatively little effort. The rolls may of course be secured to the plate $m^4$ instead of to the pan.

It will be seen that by arranging deflecting-surfaces or a partial partition about the back and sides of the magazine the products of combustion are caused to be moved outward and upward against the front of the stove to the upper part or top thereof, and that by the arrangement of corner flues and the extension of the combustion-chamber backward upon either side of the magazine and in the upper part of the stove a very large radiating-surface of great power is provided, which has not heretofore been so directly utilized, and that this construction of the combustion-chamber in magazine-stoves, taken in connection with the arrangement of the flues herein specified, provides the stove with great heating capacity; also, that by forming the heating-chamber $F^2$ as herein specified the radiating-surface of the stove is still further increased.

The arrangement of the partial partition and deflecting-surface in the combustion-chamber of the magazine-stove so that the products of combustion are compelled to pass to the top of the stove before they descend I consider to be of very great advantage; and I would here state that I do not confine myself to the special means herein described for accomplishing this object.

In use the magazine is supplied with coal and the fire treated as in ordinary magazine-stoves, and after the fire has been sufficiently kindled the damper $c^6$ is closed, so that the products of combustion are forced by the deflecting-plate or partial partition to pass to the front and upper sections of the chamber before taking their downward course by the corner flues to the base.

Of course it is not necessary that the two sections of the air-heating chamber be united. They may be separate or detached from each other, if desired; and I have represented in Fig. 13 a form of casting for providing the deflecting-surface and these detached heating-chambers when this form of the invention is used.

I have shown in Fig. 14 another form of construction applicable to either the connected or detached heating-chambers; and it consists in making the magazines in three sections—namely, the upper section, 1, the intermediate section, 2, which is cast integral with the deflecting-plate and partition-plates which form the heating-chamber, and the lower section, 3. Of course these three parts are secured to each other by bolting, or in any desirable way. I would say, also, that the two sections of the heating-chamber, instead of being connected with each other and the escape-opening at the back by a cross-extension, may be connected by separate passages with the upper escape-opening at the back. In Figs. 10, 11, and 12 I have illustrated the application of the invention to stoves and furnaces unprovided with magazines. In this case the deflecting-partition is shaped to extend entirely across the combustion-chamber, and the heating-chamber preferably is also arranged to extend across the same above the deflecting-plate.

The heating-chamber not only serves to increase the heating capacity of the stove, but also to protect the deflecting-partition from the action of the fire by keeping its upper surface exposed to the action of cool air from without the stove.

I would also remark that the invention, so far as the use of the deflecting-plate or partition of the heating-chamber is concerned, is equally applicable to stoves having a different arrangement of flues from those herein described, for it can be used equally well with what is known in the trade as a sheet-flue stove, or to a two-flue stove, or, in fact, to stoves having any of the flue systems now in use.

Having thus fully described my invention, I claim and desire to secure by Letters Patent of the United States—

1. The combination, in a heating stove or furnace, of a magazine, a partition or deflecting plate or plates arranged upon each side of the magazine, as described, and extending inward from the rear and side walls of the combustion-chamber, and the combustion-chamber having the upward extension, $d$, and the lateral extensions or branches $d'$ $d^2$ in the top part of the stove, one upon each side of the magazine, all substantially as described.

2. The combination, in a heating stove or furnace, of a combustion-chamber, a magazine, a partial partition or deflecting plate or plates arranged in the combustion-chamber between the magazine and side of the stove, whereby the combustion-chamber is provided with a front section, $d$, and two side sections, $d'$ $d^2$, and the down-flues G G', substantially as described.

3. The combination, in a heating stove or furnace, of the magazine-wall, the plates F, F', F$^3$, and $f$, arranged in relation to each other and the side and rear plates of the stove to form the horizontally-extending air-heating chamber F$^2$, substantially as described.

4. The combination, in a heating stove or furnace, of a magazine, a combustion-chamber, and an air-heating chamber arranged between the sides of the magazine between it and the side plates of the stove, which chambers are connected with each other, the side plates of the stove having openings $f^3$ to said air-heating chambers and the rear outlet, $f^4$, substantially as described.

5. The combination, in a heating stove or furnace, of a magazine, a combustion-chamber, an air-heating chamber arranged between the side plates of the stove, as specified, the said side plates having openings $f^3$ to the chamber, the rear outlet, $f^4$, and a heat-conducting drum and pipe, $f^8 f^9$, substantially as described.

6. The combination, in a heating stove or furnace, of a magazine, the partition or deflecting plate or plates, arranged in relation to the magazine as specified, the combustion-chamber D, having the upper section, $d$, and the side sections, $d'$ $d^2$, the down-flues G G', base-flues H H' H$^2$, and up-flue H$^3$, substantially as described.

7. The combination, in a heating-stove, of a combustion-chamber, with a plate or plates extending across the same from the side plates of the stove to form the upper sections, $d'$ $d^2$, to the combustion-chamber, and the down-flues G G', substantially as described.

8. In a heating stove or furnace, the combination of the fire-pot, a combustion-chamber, a deflecting plate or partition arranged to extend into the combustion-chamber from the back plate or wall thereof, and an air-heating chamber or chambers arranged to extend from the sides of the stove above the deflecting plate or partition and opening to the outer air, and opening or outlet at the back of the stove, all substantially as described.

FRANK A. MAGEE.

In presence of—
F. F. RAYMOND, 2d,
J. M. DOLAN.